US012621239B2

(12) United States Patent
Huang

(10) Patent No.: US 12,621,239 B2
(45) Date of Patent: May 5, 2026

(54) ROUTE ADVERTISEMENT METHOD, APPARATUS, AND SYSTEM

(71) Applicant: Huawei Technologies Co., Ltd., Shenzhen (CN)

(72) Inventor: Yang Huang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 206 days.

(21) Appl. No.: 18/650,883

(22) Filed: Apr. 30, 2024

(65) Prior Publication Data

US 2024/0283737 A1 Aug. 22, 2024

Related U.S. Application Data

(63) Continuation of application No. PCT/CN2022/099511, filed on Jun. 17, 2022.

(30) Foreign Application Priority Data

Nov. 4, 2021 (CN) .......................... 202111301919.0

(51) Int. Cl.
| | |
|---|---|
| *H04L 45/00* | (2022.01) |
| *H04L 45/02* | (2022.01) |
| *H04L 45/50* | (2022.01) |

(52) U.S. Cl.
CPC ............ *H04L 45/566* (2013.01); *H04L 45/04* (2013.01); *H04L 45/50* (2013.01)

(58) Field of Classification Search
CPC ........ H04L 45/04; H04L 45/50; H04L 45/566
See application file for complete search history.

(56) References Cited

U.S. PATENT DOCUMENTS

| | | | | |
|---|---|---|---|---|
| 11,063,860 | B2 * | 7/2021 | Nagarajan ........... | H04L 12/1886 |
| 11,804,983 | B2 * | 10/2023 | Natarajan ........... | H04L 12/4633 |
| 12,375,401 | B2 * | 7/2025 | Devaraj ................ | H04L 12/462 |
| 12,452,159 | B2 * | 10/2025 | Sharma ................ | H04L 45/033 |
| 2017/0171057 | A1 * | 6/2017 | Dong .................... | H04L 45/033 |
| 2024/0283737 | A1 * | 8/2024 | Huang ................... | H04L 12/46 |
| 2024/0323121 | A1 * | 9/2024 | Shu ........................ | H04L 45/74 |

OTHER PUBLICATIONS

W. Lin et al. "EVPN Optimized Inter-Subnet Multicast (OISM) Forwarding", BESS, draft-ietf-bess-evpn-irb-mcast-06, May 2021, 77 pages. (Year: 2021).*

(Continued)

*Primary Examiner* — G. C. Neurauter, Jr.
(74) *Attorney, Agent, or Firm* — Conley Rose, P.C.

(57) ABSTRACT

A route advertisement method includes advertising, by a first network device, an Internet Protocol (IP) prefix route to a second network device, where the IP Prefix route includes a gateway (GW) IP address and a Multi-Protocol Label Switching (MPLS) label. The GW IP address is an IP address of a first interface of the first network device. The MPLS Label is a label of a first IP-virtual routing and forwarding (IP-VRF) instance of the first network device. The first network device advertises a media access control (MAC)/IP route to the second network device, where the MAC/IP route includes the IP address of the first interface and a MAC address of the first interface.

17 Claims, 7 Drawing Sheets

(56) References Cited

OTHER PUBLICATIONS

J. Rabadan et al. "Multicast Source Redundancy in EVPN Networks", BESS Workgroup, draft-ietf-bess-evpn-redundant-mcast-source-02, Aug. 2021, 31 pages. (Year: 2021).*

J. Rabadan et al. "Request for Comments (RFC) 9136: IP Prefix Advertisement in Ethernet VPN (EVPN)", Internet Engineering Task Force (IETF), Oct. 2021, 31 pages. (Year: 2021).*

A. Sajassi et al. "Request for Comments (RFC) 7432: BGP MPLS-Based Ethernet VPN", Internet Engineering Task Force (IETF), Feb. 2015, 56 pages. (Year: 2015).*

J. Rabadan et al. "Applicability of EVPN to NVO3 Networks", NVO3 Workgroup, draft-ietf-nvo3-evpn-applicability-03, Nov. 2020, 27 pages. (Year: 2020).*

J. Rabadan, Ed et al, "IP Prefix Advertisement in EVPN draft-ietf-bess-evpn-prefix-advertisement-11",BESS Workgroup, Internet Draft, Intended status: Standards Track, May 18, 2018, total 36 pages.

L. Krattiger et al, "EVPN Interoperability Modes, draft-krattiger-evpn-modes-interop-03", Jan. 25, 2021, total 18 pages.

P. Mohapatra et al, "The BGP Encapsulation Subsequent Address Family Identifier (SAFI) and the BGP Tunnel Encapsulation Attribute", Network Working Group, Request for Comments: 5512, Category: Standards Track, Apr. 2009, total 13 pages.

* cited by examiner

```
+----------------------------------------------------------------+
|  Route type (2 bytes)                                          |
+----------------------------------------------------------------+
|  Length (2 bytes)                                              |
+----------------------------------------------------------------+
|  Route type specific (variable length)                        |
+----------------------------------------------------------------+
```

```
+----------------------------------------------------------------+
|  Route distinguisher (8 bytes)                                |
+----------------------------------------------------------------+
|  Ethernet segment identifier (10 bytes)                       |
+----------------------------------------------------------------+
|  Ethernet tag ID (4 bytes)                                    |
+----------------------------------------------------------------+
|  Internet protocol prefix length (1 byte)                     |
+----------------------------------------------------------------+
|  Internet protocol prefix (4 bytes)                           |
+----------------------------------------------------------------+
|  Gateway internet protocol address (4 bytes)                  |
+----------------------------------------------------------------+
|  Multi-protocol label switching label (3 bytes)               |
+----------------------------------------------------------------+
```

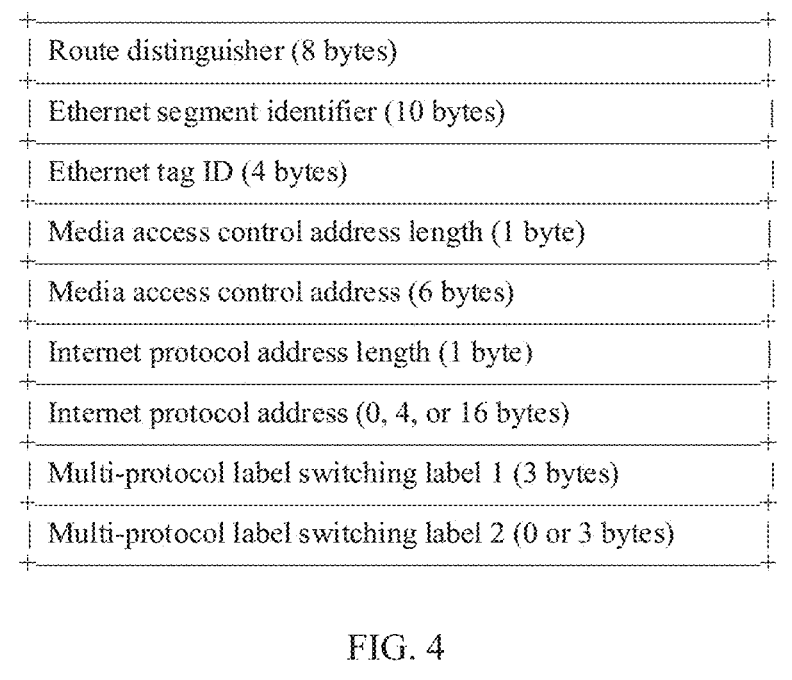

```
+----------------------------------------------------------------+
| Route distinguisher (8 bytes)                                  |
+----------------------------------------------------------------+
| Ethernet segment identifier (10 bytes)                         |
+----------------------------------------------------------------+
| Ethernet tag ID (4 bytes)                                      |
+----------------------------------------------------------------+
| Media access control address length (1 byte)                  |
+----------------------------------------------------------------+
| Media access control address (6 bytes)                        |
+----------------------------------------------------------------+
| Internet protocol address length (1 byte)                     |
+----------------------------------------------------------------+
| Internet protocol address (0, 4, or 16 bytes)                 |
+----------------------------------------------------------------+
| Multi-protocol label switching label 1 (3 bytes)              |
+----------------------------------------------------------------+
| Multi-protocol label switching label 2 (0 or 3 bytes)         |
+----------------------------------------------------------------+
```

FIG. 4

S301: A first network device advertises an IP Prefix route to a second network device, where the IP Prefix route includes a GW IP address and an MPLS Label S302: The first network device advertises a MAC/IP route to the second network device, where the MAC/IP route includes an IP address of a first interface and a MAC address of the first interface

FIG. 8

S401: A second network device receives an IP Prefix route advertised by a first network device, where the IP Prefix route includes a GW IP address and an MPLS Label S402: The second network device receives a MAC/IP route advertised by the first network device, where the MAC/IP route includes an IP address of a first interface and a MAC address of the first interface S403: The second network device generates a routing entry based on the IP Prefix route and the MAC/IP route

FIG. 9

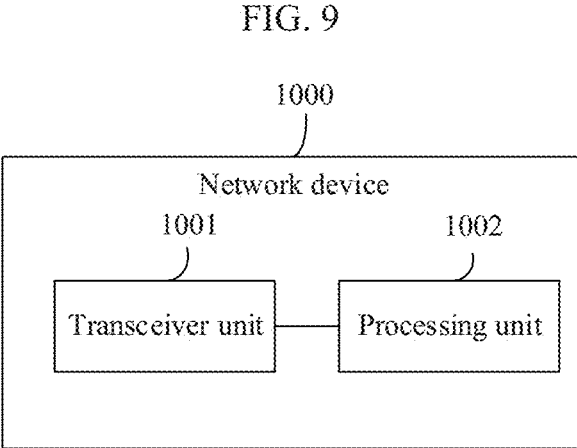

FIG. 10

ROUTE ADVERTISEMENT METHOD, APPARATUS, AND SYSTEM

CROSS-REFERENCE TO RELATED APPLICATIONS

This application is a continuation of International Patent Application No. PCT/CN2022/099511 filed on Jun. 17, 2022, which claims priority to Chinese Patent Application No. 202111301919.0 filed on Nov. 4, 2021. The disclosures of the aforementioned applications are hereby incorporated by reference in their entireties.

TECHNICAL FIELD

The present disclosure relates to the field of communication technologies, and in particular, to a route advertisement method, an apparatus, and a system.

BACKGROUND

An Ethernet virtual private network (EVPN) is a control plane protocol based on a border gateway protocol (BGP). An Internet Protocol prefix advertisement (IP Prefix) route is defined in a standard draft Rabadan, et al. "IP Prefix Advertisement in EVPN draft-ietf-bess-evpn-prefix-advertisement-11" dated May 18, 2018, released by the Internet Engineering Task Force (IETF). Service interworking between subnets may be implemented by advertising the IP Prefix route. The draft also defines a plurality of use cases to describe an application scenario of the IP Prefix route.

The draft defines a route advertisement rule for a plurality of single scenarios. For example, Internet Protocol (IP) reachability information of a subnet may be advertised by advertising the IP Prefix route in an interface-less IP— virtual routing and forwarding (VRF)-to-IP-VRF model (Interface-less Model) and an interface-ful IP-VRF-to-IP-VRF with supplementary broadcast domain (SBD) integrated routing and bridging (IRB) model (Interface-ful Model).

In an actual network environment, the Interface-less Model and the Interface-ful Model may be deployed in a mixed manner. In this networking, when a network virtualization edge (NVE) device advertises a route based on the Interface-less Model, a datacenter gateway (DGW) device that supports the Interface-ful Model cannot generate a valid routing table based on the route. When the NVE device advertises a route based on the Interface-ful Model, a DGW device that supports the Interface-less Model cannot generate a valid routing table based on the route. As a result, service reliability cannot be ensured.

SUMMARY

In view of this, embodiments of the present disclosure provide a route advertisement method, an apparatus, and a system. A first network device advertises an EVPN IP Prefix route to a second network device, where the IP Prefix route includes a gateway (GW) IP address and a Multi-Protocol Label Switching (MPLS) label, the GW IP address is an IP address of a first interface of the first network device, and the MPLS label is a label of a first IP-VRF instance of the first network device. The first network device advertises an EVPN media access control (MAC)/IP route to the second network device, where the MAC/IP route includes the IP address of the first interface and a MAC address of the first interface. An IP Prefix route sent by the first network device in an Interface-less Model is the same as a route sent in an Interface-ful Model. This resolves a route advertisement problem in a scenario in which the Interface-less Model and the Interface-ful Model are mixed, so that service interworking can be implemented regardless of whether a route reflector (RR) device is deployed, service reliability in this scenario is ensured, and network planning and configuration is simplified. In addition, a maximum of one RR device is needed when the RR device is deployed. This reduces a quantity of RRs.

A technical solution provided in embodiments of the present disclosure is as follows.

According to a first aspect, the present disclosure provides a route advertisement method. The method includes: A first network device advertises an EVPN IP Prefix route to a second network device, where the IP Prefix route includes a gateway internet protocol GW IP address and a MPLS Label, the GW IP address is an IP address of a first interface of the first network device, and the MPLS Label is a label of a first IP-VRF instance of the first network device. The first network device advertises an EVPN MAC/IP route to the second network device, where the MAC/IP route includes the IP address of the first interface and a MAC address of the first interface.

Based on the solution provided in this embodiment, in a route advertisement process in a scenario in which an Interface-less Model and an Interface-ful Model are mixed, the first network device advertises the IP Prefix route to the second network device, where the IP Prefix route includes the GW IP address and the multi-protocol label switching label MPLS Label, the GW IP address is the IP address of the first interface of the first network device, and the MPLS Label is the label of the first IP-VRF instance of the first network device. The first network device advertises the EVPN MAC/IP route to the second network device, where the MAC/IP route includes the IP address of the first interface and the MAC address of the first interface. This resolves a route advertisement problem in the scenario in which the Interface-less Model and the Interface-ful Model are mixed, so that service interworking can be implemented regardless of whether an RR device is deployed, service reliability in this scenario is ensured, and network planning and configuration is simplified. In addition, a maximum of one RR device is needed when the RR device is deployed. This reduces a quantity of RRs.

In a possible implementation, the first network device advertises the IP Prefix route and the MAC/IP route to the second network device by using a RR.

In a possible implementation, the first interface of the first network device is a first SBD IRB interface, the first SBD IRB interface belongs to an SBD, the second network device includes a second IP-VRF instance, a second interface of the second network device is a second SBD IRB interface, the second SBD IRB interface belongs to the SBD, and the SBD is used to connect the first IP-VRF instance and the second IP-VRF instance.

In a possible implementation, the first interface of the first network device is a first SBD IRB interface, the first SBD IRB interface belongs to an SBD, the second network device includes a second IP-VRF instance, and a second interface of the second network device does not support SBD IRB.

In a possible implementation, the first network device is a NVE device or a DGW device.

In a possible implementation, the second network device is an NVE device or a DGW device.

According to a second aspect, the present disclosure provides a route advertisement method. The method includes: A second network device receives an EVPN IP Prefix route advertised by a first network device, where the IP Prefix route includes a GW IP address and a multi-protocol label switching label MPLS Label, the GW IP address is an IP address of a first interface of the first network device, and the MPLS Label is a label of a first IP-VRF instance of the first network device. The second network device receives an EVPN MAC/IP route advertised by the first network device, where the MAC/IP route includes the IP address of the first interface and a MAC address of the first interface.

In a possible implementation, the second network device receives the IP Prefix route and the MAC/IP route by using a RR.

In a possible implementation, the second network device includes a second IP-VRF instance, a second interface of the second network device does not support SBD IRB, and the second network device generates, based on the IP Prefix route, a routing entry corresponding to the second IP-VRF instance, where the routing entry includes the MPLS Label.

In a possible implementation, the second network device includes a second IP-VRF instance, a second interface of the second network device is a second SBD IRB interface, the second SBD IRB interface belongs to an SBD, the SBD is used to connect the first IP-VRF instance and the second IP-VRF instance, and the second network device generates, based on the IP Prefix route, a routing entry corresponding to the second IP-VRF instance, where the routing entry includes the GW IP address. The second network device generates an entry of an Address Resolution Protocol (ARP) table based on the MAC/IP route, where the entry includes the IP address of the first interface and the MAC address of the first interface.

In a possible implementation, the first network device is a NVE device or a DGW device.

In a possible implementation, the second network device is an NVE device or a DGW device.

According to a third aspect, the present disclosure provides a network device, including a transceiver unit and a processing unit. The transceiver unit is configured to perform a receiving operation and a sending operation in the method according to any one of the foregoing aspects and the possible implementations of any one of the foregoing aspects. The processing unit is configured to perform an operation other than the receiving operation and the sending operation in the method according to any one of the foregoing aspects and the possible implementations of any one of the foregoing aspects. For example, when the network device according to the third aspect is used as a first network device to perform the method according to the first aspect, the processing unit is configured to: generate the IP Prefix route, where the IP Prefix route includes the GW IP address and the MPLS Label; and is further configured to generate the MAC/IP route, where the MAC/IP route includes the IP address of the first interface and the MAC address of the first interface. The transceiver unit is configured to advertise the IP Prefix route and the MAC/IP route to the second network device.

According to a fourth aspect, the present disclosure provides a network device. The network device includes a memory and a processor. The memory is configured to store program code. The processor is configured to run instructions in the program code, to enable the network device to perform the method according to any one of the foregoing aspects and the possible implementations of any one of the foregoing aspects. For example, when the network device according to the fourth aspect is used as a first network device to perform the method according to the first aspect, the processor executes the instructions, to enable the network device to be configured to: advertise the IP Prefix route to the second network device, where the IP Prefix route includes the GW IP address and the MPLS Label; and advertise the MAC/IP route to the second network device, where the MAC/IP route includes the IP address of the first interface and the MAC address of the first interface.

According to a fifth aspect, the present disclosure provides a network device. The network device includes a communication interface and a processor. The communication interface is configured to perform a receiving operation and a sending operation in the method according to any one of the foregoing aspects and the possible implementations of any one of the foregoing aspects. The processor is configured to perform an operation other than the receiving operation and the sending operation in the method according to any one of the foregoing aspects and the possible implementations of any one of the foregoing aspects. For example, when the network device according to the fifth aspect is used as a first network device to perform the method according to the first aspect, the processor is configured to: generate the IP Prefix route, where the IP Prefix route includes the GW IP address and the MPLS Label; and is further configured to generate the MAC/IP route, where the MAC/IP route includes the IP address of the first interface and the MAC address of the first interface. The communication interface is configured to advertise the IP Prefix route and the MAC/IP route to the second network device.

According to a sixth aspect, the present disclosure provides a communication system. The communication system includes a first network device and a second network device. The first network device may be the network device according to any one of the third aspect to the fifth aspect, and is configured to perform some or all operations performed by the first network device according to any one of the foregoing aspects and the possible implementations. The second network device may be the network device according to any one of the third aspect to the fifth aspect, and is configured to perform some or all operations performed by the second network device according to any one of the foregoing aspects and the possible implementations.

According to a seventh aspect, the present disclosure provides a computer-readable storage medium. The computer-readable storage medium stores instructions, and when the instructions are run on a processor, the processor is enabled to perform some or all operations in the method according to any one of the foregoing aspects and the possible implementations of any one of the foregoing aspects.

According to an eighth aspect, the present disclosure provides a computer program product. The computer program product includes instructions. When the computer program product runs on a processor, the processor is enabled to perform some or all operations in the method according to any one of the foregoing aspects and the possible implementations of any one of the foregoing aspects.

By using the technical solution of the present disclosure, the first network device sends the IP Prefix route to the second network device, where the IP Prefix route includes the GW IP address and the MPLS Label, the GW IP address is the IP address of the first interface of the first network device, and the MPLS Label is the label of the first IP-VRF instance of the first network device. The first network device sends the MAC/IP route to the second network device, where the MAC/IP route includes the IP address of the first interface and the MAC address of the first interface. The IP Prefix route sent by the first network device in the Interface-less Model is the same as the IP Prefix route sent in the Interface-ful Model. This resolves the route advertisement problem in the scenario in which the Interface-less Model and the Interface-ful Model are mixed, so that service interworking can be implemented regardless of whether an RR device is deployed, service reliability in this scenario is ensured, and network planning and configuration is simplified. In addition, a maximum of one RR device is needed when the RR device is deployed. This reduces a quantity of RRs.

BRIEF DESCRIPTION OF DRAWINGS

FIG. 4 is a schematic diagram of a format of a MAC/IP route according to an embodiment of the present disclosure;

FIG. 8 is a method flowchart of advertising a route by a first network device according to an embodiment of the present disclosure;

FIG. 9 is a method flowchart of receiving a route by a second network device according to an embodiment of the present disclosure;

FIG. 10 is a schematic structural diagram of a network device according to an embodiment of the present disclosure;

DESCRIPTION OF EMBODIMENTS

The following separately provides detailed descriptions by using specific embodiments.

Before embodiments of the present disclosure are described, some technical terms in the present disclosure are briefly described.

IP-VRF means to store an IP prefix of an IP address space of a tenant and flooding the IP prefix between network devices by using an EVPN route. One IP-VRF instance is a layer 3 VPN instance.

An IRB interface is an integrated routing and bridging interface and is a logical interface of a bridging table (BT). The IRB interface is associated to one IP-VRF and supports layer 2 termination and layer 3 forwarding.

An SBD is a broadcast domain (BD) that has only the IRB interface on a network side, and is used to connect all IP-VRF instances of a same tenant. For example, an NVE device has a first IP-VRF instance, a DGW device has a second IP-VRF instance, the first IP-VRF instance and the second IP-VRF instance belong to a same tenant, and IP-VRF instances of the same tenant are connected by using the SBD to implement interworking. The IRB interface of the SBD is an SBD IRB interface.

A route target (RT) is used to control import and export of a VPN route. The RT is classified into an import route target (IRT) and an export route target (ERT). The ERT is carried in an extended community attribute of a BGP EVPN route for transferring. After receiving BGP EVPN routes, a receiving device retains only a BGP EVPN carrying an ERT that matches a local IRT. For example, an ERT carried in an EVPN route is 100:1, which matches the IRT of 100:1 of a local VPN instance on the receiving device. Then, the receiving device saves the corresponding route to a corresponding IP-VRF routing table.

A route distinguisher (RD) is a distinguisher of a VPN and indicates different VPNs. The different VPNs may have a same IP version 4 (IPv4) address. A BGP attaches a unique distinguisher RD of a VPN to an IPv4 route prefix and converts a non-unique IPv4 address into a globally unique address.

Figures 1, 2, 3:
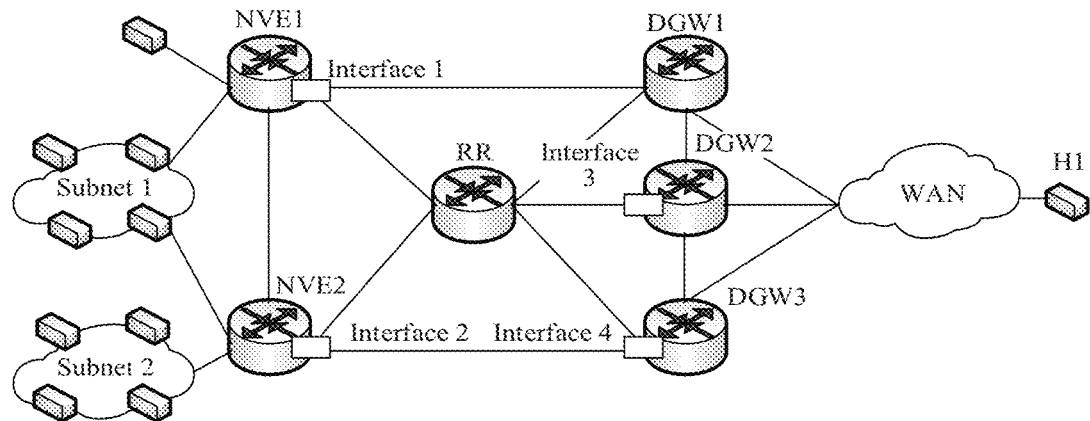
FIG. 1 is a schematic diagram of a scenario according to an embodiment of the present disclosure.
FIG. 2 is a schematic diagram of a format of an EVPN Network Layer Reachability Information (NLRI) field according to an embodiment of the present disclosure.
FIG. 3 is a schematic diagram of a format of an IP Prefix route according to an embodiment of the present disclosure.

FIG. 1 is a schematic diagram of a scenario according to an embodiment of the present disclosure. The following describes the scenario shown in FIG. 1. FIG. 1 shows a scenario in which an Interface-less Model and an Interface-ful Model are mixed. The Interface-less Model means that a device in the scenario has no SBD IRB interface, and the Interface-ful Model means that a device in the scenario includes an SBD IRB interface. The scenario shown in FIG. 1 includes an NVE device, a DGW device, an RR device, and a host H1 of a wide area network (WAN). FIG. 1 shows two NVE devices, which are respectively NVE1 and NVE2; three DGW devices, which are respectively DGW1, DGW2, and DGW3; one RR device; and one host H1. The RR separately establishes a BGP peer with the device NVE1, the device NVE2, the device DGW1, the device DGW2, and the device DGW3. The RR may be directly connected to the device NVE1, the device NVE2, the device DGW1, the device DGW2, and the device DGW3, or may be connected to the device NVE1, the device NVE2, the device DGW1, the device DGW2, and the device DGW3 via a network. In the scenario in FIG. 1, there may be no RR device. In this case, a BGP peer is directly established between network devices to advertise a BGP route. For example, a BGP peer is established between the device NVE1 and the device DGW1. A communication network between the network devices, for example, a communication network between NVE1 and DGW1, transmits data in a manner of a tunnel. The tunnel may be a virtual extensible local area network (VXLAN) tunnel, a Generic Network Virtualization Encapsulation (GENEVE) tunnel, or a Multi-Protocol Label Switching (MPLS) tunnel. The device NVE1, the device NVE2, the device DGW2, and the device DGW3 include SBD IRB interfaces, which are respectively an interface 1, an interface 2, an interface 3, and an interface 4. The device DGW1 does not include an SBD IRB interface. In the mixed scenario, a device including an SBD IRB interface supports the Interface-ful Model, and a device that does not include an SBD IRB interface supports the Interface-less Model. Both the NVE device and the DGW device include an IP-VRF instance. The device NVE1 has two BDs: a BD-1 and a BD-2. The BD-1 has a network device whose IP address is IP10. The BD-2 corresponds to a subnet 1. Both the BD-1 and the BD-2 are associated with an IP-VRF instance. NVE2 has two BDs: a BD-2 and a BD-3. The BD-2 also corresponds to the subnet 1. The BD-3 corresponds to a subnet 2. Both the BD-2 and the BD-3 are associated with an IP-VRF instance.

The following describes, by using an example in which a route of the subnet 1 is advertised, a route advertisement method in the scenario in which the Interface-less Model and the Interface-ful Model are mixed shown in FIG. 1. The device NVE1 and the device NVE2 in FIG. 1 are both connected to the subnet 1 and may both advertise the route of the subnet 1. The following uses an example in which the device NVE1 advertises the route of the subnet 1 for description.

In an implementation, the device NVE1 supports route advertisement in an Interface-ful Model mode, and the device NVE1 advertises an IP Prefix route and a MAC/IP route in the Interface-ful Model mode.

The IP Prefix route is a type of an EVPN route, and the EVPN route includes an EVPN NLRI field. A format of the EVPN NLRI field is shown in FIG. 2. The EVPN NLRI field includes, for example, a 2-byte route type field, a 2-byte length field, and a variable-length route type specific field. When a value of Route Type is 5, Route Type indicates that the type of the EVPN route is the IP Prefix route. Therefore, the IP Prefix route is also referred to as a Type 5 route. In this case, Route Type Specific is NLRI of the IP Prefix route.

A specific format of the NLRI of the IP Prefix route is shown in FIG. 3. The NLRI of the IP Prefix route includes an 8-byte RD field, a 10-byte Ethernet segment identifier (ESI) field, a 4-byte Ethernet tag ID field, a 1-byte IP Prefix length field, a 4-byte IP Prefix field, a 4-byte GW IP address field, and 3-byte MPLS label field.

That the device NVE1 needs to fill information in the NLRI of the IP Prefix route when the device NVE1 supports advertising the IP Prefix route in the Interface-ful Model mode includes: filling an RD value in the RD field shown in FIG. 3, filling a network segment IP address of the subnet 1 in the IP Prefix field shown in FIG. 3, and filling an IP address of an SBD IRB interface in the GW IP field shown in FIG. 3. In addition, an ERT is carried in an RT extended community attribute of a BGP.

For a definition and a specific format of the RT extended community attribute, refer to descriptions in Request for Comments (RFC) 4684. Content of related parts in this document is incorporated herein by reference.

The MAC/IP route is also a type of an EVPN route. The EVPN route includes an EVPN NLRI field. A format of the EVPN NLRI field is shown in FIG. 2. When a value of Route Type in the EVPN NLRI field is 2, Route Type indicates that the type of the EVPN route is the MAC/IP route. Therefore, the MAC/IP route is also referred to as a Type 2 route. In this case, Route Type Specific is NLRI of the MAC/IP route. A specific format of the NLRI of the MAC/IP route is shown in FIG. 4. The MAC/IP route includes an 8-byte RD field, a 10-byte ESI field, a 4-byte Ethernet tag ID field, a 1-byte MAC address length field, a 6-byte MAC address field, a 1-byte IP address length field, a 0-byte, 4-byte, or 16-byte IP address field, a 3-byte MPLS label 1 field, and a 0-byte or 3-byte MPLS label 2 field.

That the device NVE1 needs to fill information in the NLRI of the MAC/IP route when the device NVE1 advertises the route of the subnet 1 in the Interface-ful Model mode includes: filling the IP address of the SBD IRB interface in the IP address field shown in FIG. 4, filling a MAC address of the SBD IRB interface in the MAC address field shown in FIG. 4, and filling a label of the IP-VRF instance in the MPLS Label1 field shown in FIG. 4. In a scenario in which forwarding is performed between NVE1 and DGW1 through a VXLAN tunnel, a VXLAN network identifier (VNI) is used as the label of the IP-VRF instance. In a scenario in which forwarding is performed between NVE1 and DGW1 through an MPLS tunnel, an MPLS Label is used as the label of the IP-VRF instance. In addition, an IP address of a loopback interface of the device NVE1 is filled in a BGP next hop field, and an ERT that identifies an SBD is carried in the RT extended community attribute.

The RR device receives the IP Prefix route, saves a corresponding route to a corresponding BGP routing table based on RD and IP Prefix in the IP Prefix NLRI, and reflects the IP Prefix route. The RR device receives the MAC/IP route, and reflects the MAC/IP route.

In a specific implementation, the RR separately establishes the BGP peer with NVE1, NVE2, DGW1, DGW2, and DGW3. After receiving the IP Prefix route and the MAC/IP route that are advertised based on the BGP, the RR separately advertises the IP Prefix route to the device NVE2, the device DGW1, the device DGW2, and the device DGW3. The RR acts as a RR, and does not modify a BGP next hop, where the BGP next hop is a next hop carried when the IP Prefix route is advertised by using the BGP.

The device DGW2 receives the MAC/IP route, where the MAC/IP route carries the IP address and the MAC address of the SBD IRB interface of NVE1; and associates the MAC/IP route to the SBD based on the ERT that identifies the SBD and that is carried in the MAC/IP route, to learn that an outbound interface is the SBD IRB interface. An entry of an ARP table is generated based on the MAC/IP route, and the IP address of the SBD IRB interface of NVE1, the MAC address of the SBD IRB interface of NVE1, and the outbound interface are written into the ARP table as shown in Table 1.

TABLE 1

| IP Prefix | MAC | Outbound interface |
|---|---|---|
| IP address of the SBD IRB interface of NVE1 | MAC address of the SBD IRB interface of NVE1 | SBD IRB interface |

The device DGW2 finds out, based on an address in the BGP next hop, that an outbound interface of a corresponding tunnel is a tunnel Tunnel1, and records the MAC address of the SBD IRB interface of NVE1, the label of the IP-VRF instance of NVE1, and the corresponding outbound interface in a MAC table as shown in Table 2.

TABLE 2

| MAC | MPLS Label | Outbound interface |
|---|---|---|
| MAC address of the SBD IRB interface of NVE1 | Label of the IP-VRF instance of NVE1 | Tunnel1 |

DGW2 receives the IP Prefix route. The device DGW2 supports the Interface-ful Model. After receiving the IP Prefix route, the device DGW2 uses an address in the GW IP field as the BGP next hop, finds out, in the ARP table based on the address in the GW IP field, that a corresponding outbound interface is the SBD IRB interface, and saves the network segment IP address of the subnet 1, the IP address of the SBD IRB interface of NVE1, and the found outbound interface to a corresponding IP-VRF table as shown in Table 3, for subsequent packet forwarding.

TABLE 3

| IP Prefix | BGP next hop | Outbound interface |
| --- | --- | --- |
| Network segment IP address of the subnet 1 | IP address of the SBD IRB interface of NVE1 | SBD IRB interface |

For a processing manner in which DGW1 receives the MAC/IP route, refer to related descriptions in which the device DGW2 receives the MAC/IP route. When the device DGW1 receives the IP Prefix route, because the device DGW1 supports an Interface-less Model mode, the device DGW1 ignores the GW IP field, and finds out that a value filled in the MPLS Label field is 0. When the device DGW1 generates an IP-VRF entry based on an identifier in the MPLS Label field, MPLS Label information in the generated IP-VRF entry is 0. Subsequently, MPLS Label is used to encapsulate a packet, and when the packet reaches the device NVE1, the packet cannot correspond to the IP-VRF instance of NVE1 based on the value of MPLS Label.

In another implementation, the device NVE1 supports route advertisement in the Interface-less Model mode. When advertising the route of the subnet 1 in the Interface-less Model mode, the device NVE1 advertises reaching of the route of the subnet 1 by using the IP Prefix route.

That the device NVE1 needs to fill information in the NLRI of the IP Prefix route when the device NVE1 advertises the route of the subnet 1 in the Interface-less Model mode includes: filling the RD value in the RD field shown in FIG. 3, filling the network segment IP address of the subnet 1 in the IP Prefix field shown in FIG. 3, and filling the label of the IP-VRF instance in the MPLS Label field shown in FIG. 3. The IP address of the Loopback interface of the device NVE1 is filled in the BGP next hop field and the ERT is carried in the RT extended community attribute.

The RR device receives the IP Prefix route, saves a corresponding route to a corresponding BGP routing table based on RD and IP Prefix in the IP Prefix NLRI, and reflects the IP Prefix route.

The device DGW1 receives the IP Prefix route. The device DGW1 supports the Interface-less Model. After receiving the IP Prefix route, the device DGW1 ignores the GW IP field, saves information in the IP Prefix field and the MPLS Label field to a corresponding IP-VRF table, then learns, through querying based on the address in the BGP next hop, that an outbound interface of a corresponding tunnel is Tunnel1, and saves the outbound interface to an outbound interface in the corresponding IP-VRF table for subsequent packet forwarding. Table 4 shows the IP-VRF table generated on DGW1 based on an IP Prefix packet, where Tunnel1 indicates that the outbound interface is a tunnel. When a subsequent packet reaches the device DGW1, the device DGW1 matches a corresponding IP Prefix based on a destination IP address of the packet. If the destination IP address of the packet belongs to the network segment IP address of the subnet 1, the device DGW1 selects this routing entry for packet forwarding.

TABLE 4

| IP Prefix | MPLS Label | Outbound interface |
| --- | --- | --- |
| Network segment IP address of the subnet 1 | Label of the IP-VRF instance of NVE1 | Tunnel1 |

The device DGW2 receives the IP Prefix route. The device DGW2 supports the Interface-ful Model. After receiving the IP Prefix route, the device DGW2 ignores the MPLS Label field, and finds out that the IP address filled in the GW IP field is 0. When generating an IP-VRF entry based on the IP address in the GW IP field, the device DGW2 cannot find out a corresponding outbound interface in an ARP based on the address in the GW IP field, and outbound interface information in the generated IP-VRF entry is invalid, and cannot be used for subsequent packet forwarding.

It may be learned from the foregoing two implementations that, in the mixed scenario, if the device NVE1 advertises a route in the Interface-less Model mode, the device DGW1 supporting the Interface-less Model mode may generate a corresponding routing entry based on the route, and GW IP information in a corresponding routing entry generated based on the route by the device DGW2 supporting the Interface-ful Model mode is invalid. If the device NVE1 advertises a route in the Interface-ful Model mode, the device DGW2 may generate a corresponding routing entry, and MPLS Label information in the routing entry generated by the device DGW1 is invalid. Therefore, in the mixed scenario, if the device NVE1 advertises a route in a single mode, service reliability cannot be ensured.

Figure 5:
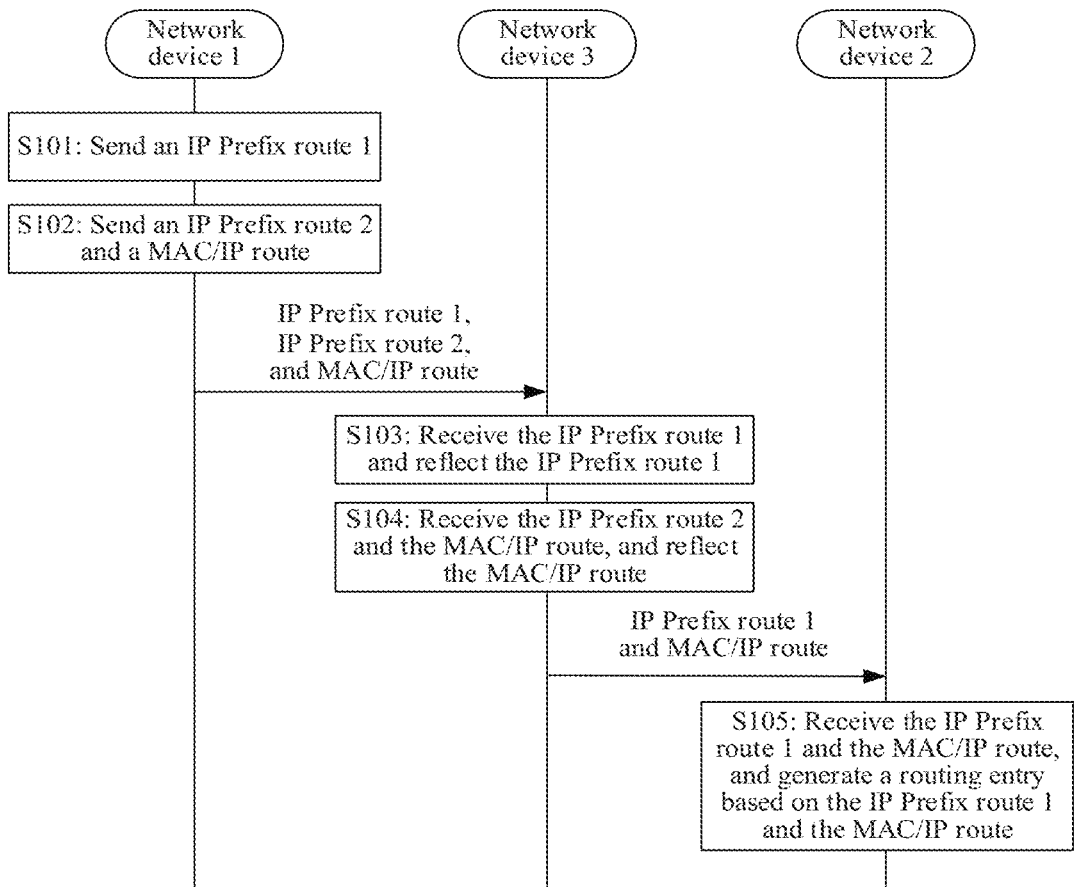
FIG. 5 is a flowchart of a route advertisement method according to an embodiment of the present disclosure.

The present disclosure provides a possible solution, and describes a route advertisement method in a mixed scenario. A device NVE1 supports route advertisement in an Interface-less Model mode and an Interface-ful Model mode separately, to resolve a problem that the device NVE1 advertises a route in a single mode. With reference to FIG. 5, the following specifically describes a method 100 for advertising a route of a subnet 1 in a mixed deployment scenario. The method 100 may be applied to the scenario shown in FIG. 1, where a network device 1 corresponds to the device NVE1 or the device NVE2 shown in FIG. 1, a network device 2 corresponds to the device DGW1, the device DGW2, or the device DGW3 shown in FIG. 1, and a network device 3 corresponds to the RR device shown in FIG. 1. The method 100 includes S101 to S105.

S101: The network device 1 sends an IP Prefix route 1, where a format of the IP Prefix route 1 is shown in FIG. 3. For information carried in the IP Prefix route 1, refer to related descriptions of the IP Prefix route sent by the device NVE1 in the Interface-less Model mode.

S102: The network device 1 sends an IP Prefix route 2 and a MAC/IP route, where a format of the IP Prefix route 2 is shown in FIG. 3, and a format of the MAC/IP route is shown in FIG. 4. For information carried in the IP Prefix route 2 and the MAC/IP route, refer to related descriptions of the route sent by the device NVE1 in the Interface-ful Model mode.

S103: The network device 3 receives the IP Prefix route 1 sent by the network device 1, and reflects the IP Prefix route 1.

S104: The network device 3 receives the IP Prefix route 2 and the MAC/IP route that are sent by the network device 1, and reflects the MAC/IP route.

Because an RD value and IP Prefix of the IP Prefix route 2 are the same as those of the IP Prefix route 1 in S303, the RR only selects one optimal route of the two routes for reflection, and the IP Prefix route 1 is reflected.

S105: The network device 2 receives the IP Prefix route 1 and the MAC/IP route.

In a specific implementation, the network device 2 is the device DGW1. For a specific implementation in which the network device 2 receives the IP Prefix route 1, refer to related descriptions in which the device NVE1 advertises a route in the Interface-less Mode and the device DGW1 receives the route in the Interface-less Mode. A corresponding routing entry may be generated based on the IP Prefix route 1.

In a specific implementation, the network device 2 is the device DGW2. For a specific implementation in which the network device 2 receives the IP Prefix route 1, refer to related descriptions in which the device NVE1 advertises the route in the Interface-less Mode and the device DGW2 receives the route in the Interface-ful Mode. In a corresponding routing entry generated by the device DGW2 based on the route, GW IP information is 0, and cannot be used for subsequent packet forwarding.

According to the method 100, in the mixed deployment scenario, an NVE device may advertise two types of IP Prefix routes, and a method for route advertisement in this scenario is provided. The NVE device may send a route according to the method 100 without a need of learning whether a DGW device supports the Interface-less Mode or the Interface-ful Mode. This simplifies network configuration. However, when only one RR is deployed, both the two types of routes need to be reflected to the DGW device through the same RR. After receiving the two routes, the RR determines that the two routes correspond to a same entry in a BGP routing table. The RR selects one optimal route according to a BGP route selection policy, records the route in the BGP routing table, and reflects the route to a BGP peer of the RR. In this case, a route that is not selected become invalid, and correspondingly, a service that needs this routing mode cannot be guaranteed. For example, in the method 100, the device DGW2 supports the Interface-ful Model. After receiving the IP Prefix route 1, the device DGW2 parses the IP Prefix1 route 1, and finds out that GW IP=0. As a result, when generating an IP-VRF entry based on GW IP, the device DGW2 cannot find a corresponding outbound interface in an ARP based on an address in the GW IP field, and outbound interface information in the generated IP-VRF entry is invalid, and cannot be used for subsequent packet forwarding.

To resolve the foregoing problem, deploying two RRs in a network may be attempted. One RR is responsible for reflecting a route advertised by the NVE device in the Interface-less Model mode, and the other RR is responsible for reflecting a route advertised by the NVE device in the Interface-ful Model mode. However, this deployment increases deployment costs of a user. In addition, in this case, network management needs to plan BGP peer configuration in a one-to-one manner in advance based on a mode supported by the NVE device and the DGW device. Planning and configuration work is extremely complex and error-prone.

In view of this, to resolve the foregoing technical problem, embodiments of the present disclosure provide a route advertisement method. The method may be applied to the network shown in FIG. 1. When the device NVE1 sends an IP Prefix route, the IP Prefix route carries valid MPLS Label and valid GW IP, and then the device NVE1 sends a MAC/IP route. The MAC/IP route includes an IP address and a MAC address of an SBD IRB interface. A format of an IP Prefix route sent by the device NVE1 in an Interface-less Model is the same as that of an IP Prefix route sent by the device NVE1 in an Interface-ful Model. When the two types of IP Prefix routes reach a same RR device, the two types of IP Prefix routes are reflected to a BGP peer. When the IP Prefix routes reach a DGW device, the DGW device selects, based on a supported mode, a field to be parsed and generates a corresponding IP-VRF entry. For example, if the device DGW1 supports the Interface-less mode, the device DGW1 ignores a GW IP field and generates a corresponding IP-VRF entry based on an MPLS Label field for subsequent packet forwarding. According to the technical solution of the present disclosure, a route advertisement problem in a scenario in which the Interface-less and the Interface-ful is mixed is resolved, so that service interworking can be implemented regardless of whether an RR device is deployed, service reliability in this scenario is ensured, and network planning and configuration is simplified. In addition, a maximum of one RR device is needed when the RR device is deployed. This reduces a quantity of RRs.

Figure 6:
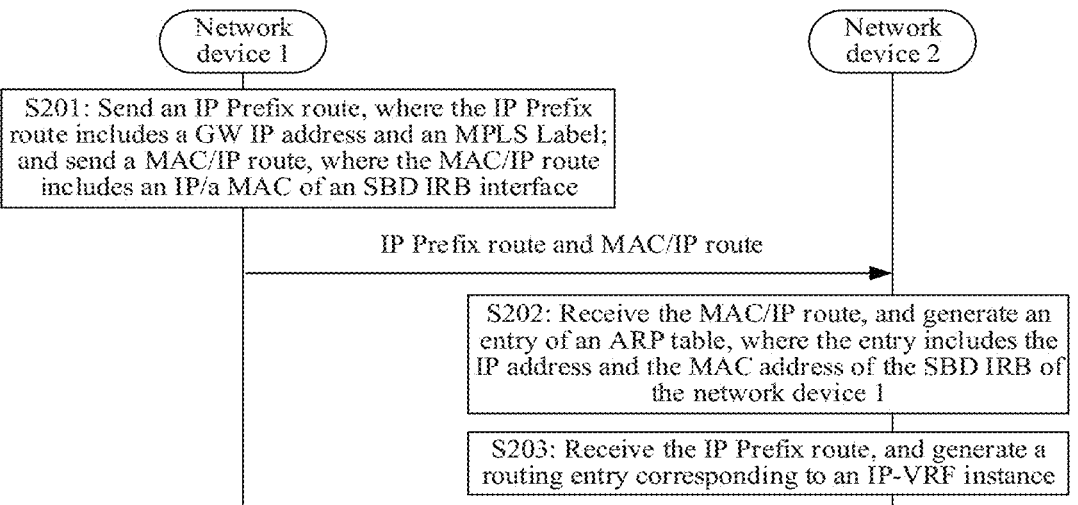
FIG. 6 is a flowchart of another route advertisement method according to an embodiment of the present disclosure.

With reference to FIG. 6, the following describes a route advertisement method 200 provided in the present disclosure. The method 200 may be applied to the scenario shown in FIG. 1. A network device 1 corresponds to the device NVE1 or the device NVE2 shown in FIG. 1, and a network device 2 corresponds to the device DGW1, the device DGW2, or the device DGW3 shown in FIG. 1. The method 200 includes S201 to S203.

S201: The network device 1 sends an IP Prefix route, where the IP Prefix route includes a GW IP address and an MPLS Label, the GW IP address is an IP address of an interface of the network device 1, and the MPLS Label is a label of an IP-VRF instance of the network device 1.

The network device 1 sends a MAC/IP route, where the MAC/IP route includes the IP address and a MAC address of the interface.

In the present disclosure, the interface may be an SBD IRB interface of the network device, or may be a loopback interface.

In a specific implementation, a format of the IP Prefix route is shown in FIG. 3, and information that needs to be filled in NLRI of the IP Prefix route includes: filling an RD value in the RD field shown in FIG. 3, filling a network segment IP address of a subnet 1 in the IP Prefix field shown in FIG. 3, filling an IP address of the SBD IRB interface in the GW IP field shown in FIG. 3, and filling the label of the IP-VRF instance in the MPLS Label field shown in FIG. 3. In addition, an IP address of a Loopback interface of the device NVE1 is filled in a BGP next hop field, and an ERT is carried in an RT extended community attribute of a BGP.

A format of the MAC/IP route is shown in FIG. 4, and information that needs to be filled in NLRI of the MAC/IP route includes: filling the IP address of the SBD IRB interface in the IP field shown in FIG. 4, filling a MAC address of the SBD IRB interface in the MAC field shown in FIG. 4, and filling the label of the IP-VRF instance in the MPLS Label1 field shown in FIG. 4. In addition, the IP address of the Loopback interface of the device NVE1 is filled in the BGP next hop field, and an ERT that identifies an SBD is carried in an RT extended community attribute.

In a specific implementation, in information that needs to be filled in the NLRI of the IP Prefix route, the IP address of the Loopback interface may be further filled in the GW IP field shown in FIG. 3. Information filled in other fields is the same as that in the foregoing implementation. In this case, in information that needs to be filled in the NLRI of the MAC/IP route, the IP address of the loopback interface needs to be filled in the IP field shown in FIG. 4, and a MAC address of the loopback interface needs to be filled in the MAC field shown in FIG. 4. In this case, the RT extended community attribute does not need to be carried. Information filled in other fields is the same as that in the foregoing implementation.

S202: The network device 2 receives the MAC/IP route, and generates an entry of an ARP table based on the MAC/IP route, where the entry includes the IP address and the MAC address of the interface.

In a specific implementation, the network device 2 receives the MAC/IP route, where the MAC/IP route carries the IP address and the MAC address of the SBD IRB interface of the network device 1; and associates with the SBD based on the ERT that identifies the SBD and that is carried in the route, to learn that an outbound interface is the SBD IRB interface; and writes the IP address of the SBD IRB interface of the network device 1, the MAC address of the SBD IRB interface of the network device 1, and the outbound interface into the ARP table. The ARP table is shown in Table 1.

The network device 2 finds out, based on an address in a BGP next hop, that an outbound interface of a corresponding tunnel is Tunnel 1, and records the MAC address of the SBD IRB interface of the network device 1, the label of the IP-VRF instance of the network device 1, and the corresponding outbound interface in a MAC table. The MAC table is shown in Table 2. In a specific implementation, the network device 2 receives the MAC/IP route, where the MAC/IP route carries the IP address and the MAC address of the loopback interface of the network device 1, then finds out, based on the IP address of the loopback interface of the network device 1, that the outbound interface of the corresponding tunnel is Tunnel1, and writes the IP address of the loopback interface of the network device 1, the MAC address of the loopback interface of the network device 1, and the outbound interface into the ARP table. The ARP table is shown in Table 1. The MAC address of the loopback interface of the network device 1, the label of the IP-VRF instance of the network device 1, and the corresponding outbound interface are recorded in the MAC table. The MAC table is shown in Table 2.

S203: The network device 2 receives the IP Prefix route, and generates, based on the IP Prefix route, a routing entry corresponding to the IP-VRF instance.

In a specific implementation, the network device 2 is the device DGW1, and the device DGW1 supports an Interface-less mode. After receiving the IP Prefix route, the device DGW1 ignores the GW IP field, saves the IP Prefix field and the MPLS Label field to a corresponding IP-VRF table, then learns, through querying based on the address in the BGP next hop, that the outbound interface of the corresponding tunnel is Tunnel1, and saves the outbound interface to an outbound interface in the corresponding IP-VRF table for subsequent packet forwarding. The IP-VRF table is shown in Table 4.

In a specific implementation, the network device 2 is the device DGW2, and the device DGW2 supports an Interface-ful mode. After receiving the IP Prefix route, the device DGW2 searches the ARP table for the corresponding outbound interface based on the address in the GW IP field, and saves the IP Prefix field, the GW IP field, and a search result to a corresponding IP-VRF table. The IP-VRF table is shown in Table 3.

In a specific implementation, the network device 2 is the device DGW3, and the device DGW3 supports both modes. The device DGW3 determines an enabled mode based on configuration. If the Interface-less mode is enabled, for a specific implementation in which the device DGW3 receives the IP Prefix route, refer to related descriptions of the first specific implementation in S203. If the Interface-ful mode is enabled, for a specific implementation in which the device DGW3 receives the IP Prefix route, refer to related descriptions of the second specific implementation in S203.

Figure 7:
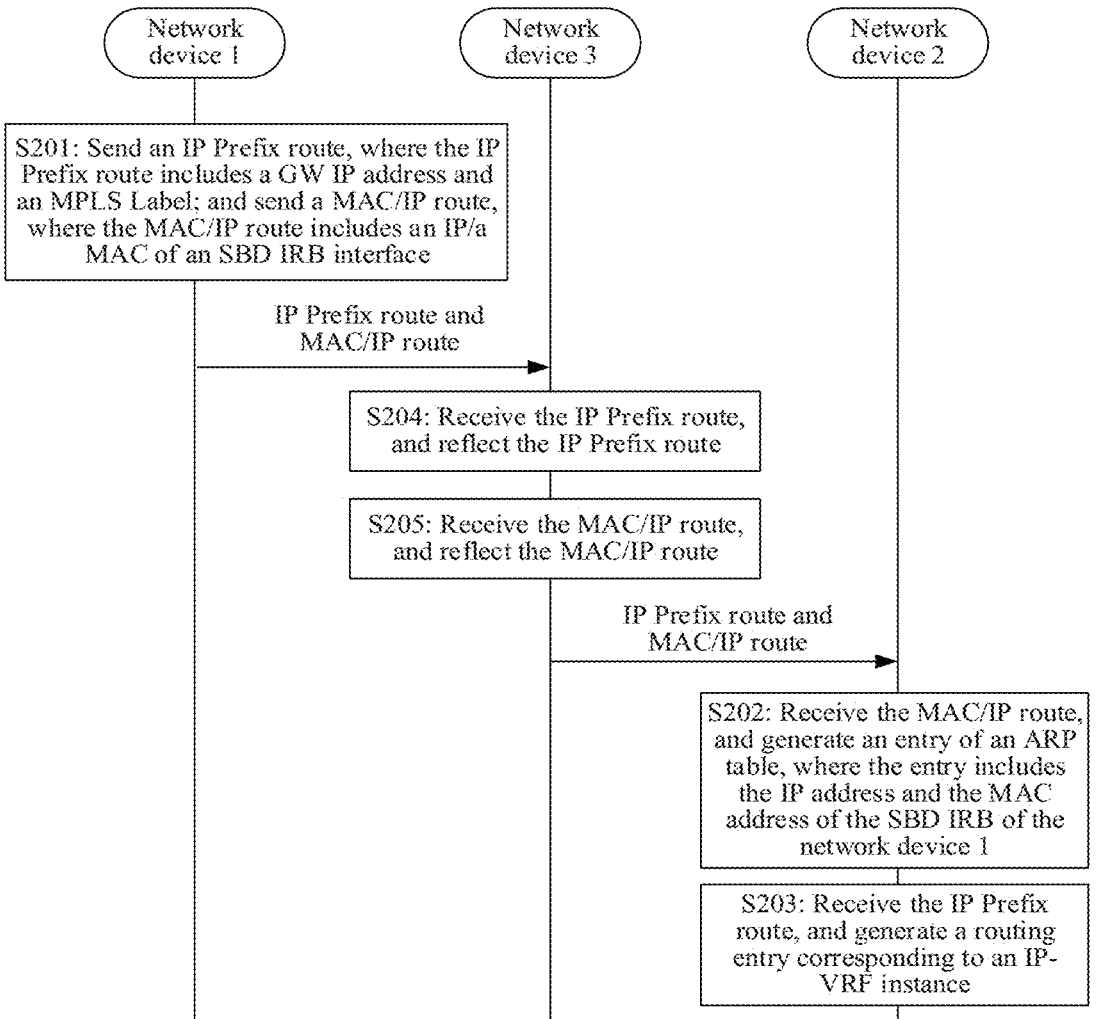
FIG. 7 is a flowchart of still another route advertisement method according to an embodiment of the present disclosure.

Optionally, the method 200 includes a network device 3 that corresponds to the RR device in the scenario shown in FIG. 1. As shown in FIG. 7, the network device 3 performs S204 and S205 between S201 and S202.

S204: The network device 3 receives the IP Prefix route, saves the IP Prefix route to a corresponding BGP routing table, and reflects the IP Prefix route.

For an operation of reflecting the IP Prefix route by the RR device in S204, refer to related implementation in the method 100.

S205: The network device 3 receives the MAC/IP route, and reflects the MAC/IP route.

For an operation of reflecting the MAC/IP route by the RR device in S205, refer to related implementation in the method 100.

With reference to FIG. 8, the following describes a route advertisement method 300 provided in the present disclosure. The method 300 may be applied to the scenario shown in FIG. 1, and a first network device corresponds to the NVE device in FIG. 1. The method 300 may be specifically used to implement the method 200 described above. When the method 300 is for implementing the method 200, the first network device in the method 300 is equivalent to the network device 1 in the method 200. The method 300 includes S301 and S302.

S301: The first network device advertises an IP Prefix route to a second network device, where the IP Prefix route includes a GW IP address and an MPLS Label, the GW IP address is an IP address of a first interface of the first network device, and the MPLS Label is a label of a first IP-VRF instance of the first network device.

Optionally, the first network device advertises the IP Prefix route to the second network device via a third network device.

For an operation of sending the IP Prefix route by the first network device in S301, for example, advertising the IP Prefix route by the first network device to the second network device, a format of the IP Prefix route, and information filled in the IP Prefix route, refer to related implementation in S201.

S302: The first network device advertises a MAC/IP route to the second network device, where the MAC/IP route includes the IP address of the first interface and a MAC address of the first interface.

Optionally, the first network device advertises the MAC/IP route to the second network device via the third network device.

For an operation of sending the MAC/IP route by the first network device in S302, for example, advertising the MAC/IP route by the first network device to the second network device, a format of the MAC/IP route, and information filled in the MAC/IP route, refer to related implementation in S201.

With reference to FIG. 9, the following describes a route advertisement method 400 provided in the present disclosure. The method 400 may be applied to the scenario shown in FIG. 1, and a second network device corresponds to the DGW device in FIG. 1. The method 400 may be specifically used to implement the method 200 described above. When the method 400 is for implementing the method 200, the second network device in the method 400 is equivalent to the network device 2 in the method 200. The method 400 includes S401 and S402.

S401: The second network device receives an IP Prefix route advertised by a first network device, where the IP Prefix route includes a GW IP address and an MPLS Label, the GW IP address is an IP address of a first interface of the first network device, and the MPLS Label is a label of a first IP-VRF instance of the first network device.

Optionally, the second network device receives, via a third network device, the IP Prefix route advertised by the first network device.

S402: The second network device receives a MAC/IP route advertised by the first network device, where the MAC/IP route includes the IP address of the first interface and a MAC address of the first interface.

Optionally, the second network device receives, via the third network device, the MAC/IP route advertised by the first network device.

S403: The second network device generates a routing entry based on the IP Prefix route and the MAC/IP route.

In a possible implementation, the second network device supports an Interface-less mode. In this case, the second network device is equivalent to the device DGW1 in FIG. 1, and the second network device includes a second IP-VRF instance. For a related operation of generating by the second network device, based on the IP Prefix route, a routing entry corresponding to the second IP-VRF instance, refer to related implementation in S203.

In a possible implementation, the second network device supports an Interface-ful mode. In this case, the second network device is equivalent to the device DGW2 in FIG. 1, the second network device includes a second IP-VRF instance, a second interface of the second network device is an SBD IRB interface, the SBD IRB interface belongs to an SBD, and the SBD is used to connect the first IP-VRF instance and the second IP-VRF instance. For related operations of generating by the second network device, based on the IP Prefix route, a routing entry corresponding to the second IP-VRF instance, refer to related implementation in S203. For a related operation of generating an entry of an ARP table by the second network device based on the MAC/IP route, refer to related implementation in S202.

In a possible implementation, the second network device supports both modes. In this case, the second network device is equivalent to the device DGW3 in FIG. 1. The second network device determines an enabled mode based on configuration, and then performs processing of receiving a route based on the enabled mode. For details, refer to related implementation in S203.

In addition, an embodiment of the present disclosure further provides a network device 1000, as shown in FIG. 10. FIG. 10 is a schematic structural diagram of the network device 1000 according to this embodiment of the present disclosure. As shown in FIG. 10, the network device 1000 includes a transceiver unit 1001 and a processing unit 1002. The network device 1000 may be configured to perform the method 100, the method 200, the method 300, or the method 400 in the foregoing embodiments.

In an example, the network device 1000 may perform the method 100 in the foregoing embodiment. When the network device 1000 is configured to perform the method 100 in the foregoing embodiment, the network device 1000 is equivalent to the network device 1 in the method 100. The network device 1000 may be applied to the application scenario shown in FIG. 1, for example, may be the device NVE1 in the scenario shown in FIG. 1. The transceiver unit 1001 is configured to perform receiving and sending operations performed by the network device 1 in the method 100. The processing unit 1002 is configured to perform an operation other than the receiving and sending operations performed by the network device 1 in the method 200. For example, the transceiver unit 1001 is configured to advertise an IP Prefix route 1 to a network device 2. The transceiver unit 1001 is further configured to advertise a MAC/IP route to the network device 2. The processing unit 1002 is configured to generate the IP Prefix route and the MAC/IP route.

In an example, the network device 1000 may perform the method 100 in the foregoing embodiment. When the network device 1000 is configured to perform the method 100 in the foregoing embodiment, the network device 1000 is equivalent to the network device 2 in the method 100. The network device 1000 may be applied to the application scenario shown in FIG. 1, for example, may be the device DGW1, the device DGW2, or the device DGW3 in the scenario shown in FIG. 1. The transceiver unit 1001 is configured to perform receiving and sending operations performed by the network device 2 in the method 100. The processing unit 1002 is configured to perform an operation other than the receiving and sending operations performed by the network device 2 in the method 100. For example, the transceiver unit 1001 is configured to receive an IP Prefix route sent by a network device 1, and is further configured to receive a MAC/IP route sent by the network device 1. The processing unit 1002 is configured to generate, based on the IP Prefix route, a routing entry corresponding to a second IP-VRF instance. The processing unit 1002 is further configured to generate an entry of an ARP table based on the MAC/IP route, where the entry includes an IP address of a first interface and a MAC address of the first interface.

In an example, the network device 1000 may perform the method 200 in the foregoing embodiment. When the network device 1000 is configured to perform the method 200 in the foregoing embodiment, the network device 1000 is equivalent to the network device 1 in the method 200. The network device 1000 may be applied to the application scenario shown in FIG. 1, for example, may be the device NVE1 in the scenario shown in FIG. 1. The transceiver unit 1001 is configured to perform receiving and sending operations performed by the network device 1 in the method 200. The processing unit 1002 is configured to perform an operation other than the receiving and sending operations performed by the network device 1 in the method 200. For example, the transceiver unit 1001 is configured to advertise an IP Prefix route to a network device 2, where the IP Prefix route includes a GW IP address and an MPLS Label. The transceiver unit 1001 is further configured to advertise a MAC/IP route to the network device 2, where the MAC/IP route includes an IP address of a first interface and a MAC address of the first interface. The processing unit 1002 is configured to generate the IP Prefix route and the MAC/IP route.

In an example, the network device 1000 may perform the method 200 in the foregoing embodiment. When the network device 1000 is configured to perform the method 200 in the foregoing embodiment, the network device 1000 is equivalent to the network device 2 in the method 200. The network device 1000 may be applied to the application scenario shown in FIG. 1, for example, may be the device DGW1, the device DGW2, or the device DGW3 in the scenario shown in FIG. 1. The transceiver unit 1001 is configured to perform receiving and sending operations performed by the network device 2 in the method 200. The processing unit 1002 is configured to perform an operation other than the receiving and sending operations performed by the network device 2 in the method 200. For example, the transceiver unit 1001 is configured to receive an IP Prefix route sent by a network device 1, where the IP Prefix route includes a GW IP address and a MPLS Label; and is further configured to receive a MAC/IP route sent by the network device 1, where the MAC/IP route includes an IP address of a first interface and a MAC address of the first interface. The processing unit 1002 is configured to generate, based on the IP Prefix route, a routing entry corresponding to a second IP-VRF instance. The processing unit 1002 is further configured to generate an entry of an ARP table based on the MAC/IP route, where the entry includes the IP address of the first interface and the MAC address of the first interface.

In an example, the network device 1000 may perform the method 300 in the foregoing embodiment. When the network device 1000 is configured to perform the method 300 in the foregoing embodiment, the network device 1000 is equivalent to the first network device in the method 300. The network device 1000 may be applied to the application scenario shown in FIG. 1, for example, may be the device NVE1 in the scenario shown in FIG. 1. The transceiver unit 1001 is configured to perform receiving and sending operations performed by the first network device in the method 300. The processing unit 1002 is configured to perform an operation other than the receiving and sending operations performed by the first network device in the method 300. For example, the transceiver unit 1001 is configured to advertise an IP Prefix route to a second network device. The transceiver unit 1001 is further configured to advertise a MAC/IP route to the second network device. The processing unit 1002 is configured to generate the IP Prefix route and the MAC/IP route.

In an example, the network device 1000 may perform the method 400 in the foregoing embodiment. When the network device 1000 is configured to perform the method 400 in the foregoing embodiment, the network device 1000 is equivalent to the second network device in the method 400. The network device 1000 may be applied to the application scenario shown in FIG. 1, for example, may be the device DGW1, the device DGW2, or the device DGW3 in the scenario shown in FIG. 1. The transceiver unit 1001 is configured to perform receiving and sending operations performed by the second network device in the method 400. The processing unit 1002 is configured to perform an operation other than the receiving and sending operations performed by the second network device in the method 400. For example, the transceiver unit 1001 is configured to receive an IP Prefix route sent by a first network device, and is further configured to receive a MAC/IP route sent by the first network device. The processing unit 1002 is configured to generate a corresponding entry based on the IP Prefix route and the MAC/IP route.

It should be noted that, in this embodiment of the present disclosure, division into the units is an example, and is merely a logical function division. In actual implementation, another division manner may be used. Functional units in this embodiment of the present disclosure may be integrated into one processing unit, or each of the units may exist alone physically, or two or more units may be integrated into one unit. For example, in the foregoing embodiment, the transceiver unit 1001 and the processing unit 1002 may be a same unit or different units. The integrated unit may be implemented in a form of hardware, or may be implemented in a form of a software functional unit.

Figure 11:
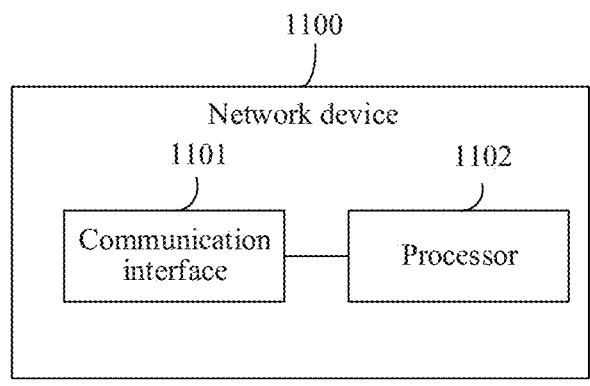
FIG. 11 is a schematic structural diagram of a network device according to an embodiment of the present disclosure.

In addition, an embodiment of the present disclosure further provides a network device 1100. FIG. 11 is a schematic structural diagram of the network device 1100 according to this embodiment of the present disclosure. The network device 1100 includes a communication interface 1101 and a processor 1102 connected to the communication interface 1101. The communication interface is, for example, an apparatus such as a transceiver. The network device 1100 may be configured to perform the method 100, the method 200, the method 300, or the method 400 in the foregoing embodiments. Specifically, the network device 1100 may be used as a network device 1 to perform an operation performed by the network device 1 in the method 100 or the method 200, and the network device 1100 may be used as a network device 2 to perform an operation performed by the network device 2 in the method 100 or the method 200. The communication interface 1101 is configured to perform receiving and sending operations performed by the network device 1 or the network device 2 in the method 200. The processor 1102 is configured to perform an operation other than the receiving and sending operations performed by the network device 1 or the network device 2 in the method 200. The network device 1100 may be used as a first network device to perform an operation performed by the first network device in the method 300, and the network device 1100 may be used as a second network device to perform an operation performed by the second network device in the method 400. The communication interface 1101 is configured to perform receiving and sending operations performed by the first network device or the second network device in the method 300 or the method 400. The processor 1102 is configured to perform an operation other than the receiving and sending operations performed by the first network device or the second network device in the method 300 or the method 400. For example, when the network device 1100 is used as the network device 1 to perform the method 200, the communication interface 1101 is configured to advertise an IP Prefix route to the network device 2, where the IP Prefix route includes a GW IP address and an MPLS Label; and is further configured to advertise a MAC/IP route to the network device 2, where the MAC/IP route includes an IP address of a first interface and a MAC address of the first interface. The processor 1102 is configured to generate the IP Prefix route and the MAC/IP route.

Figure 12:
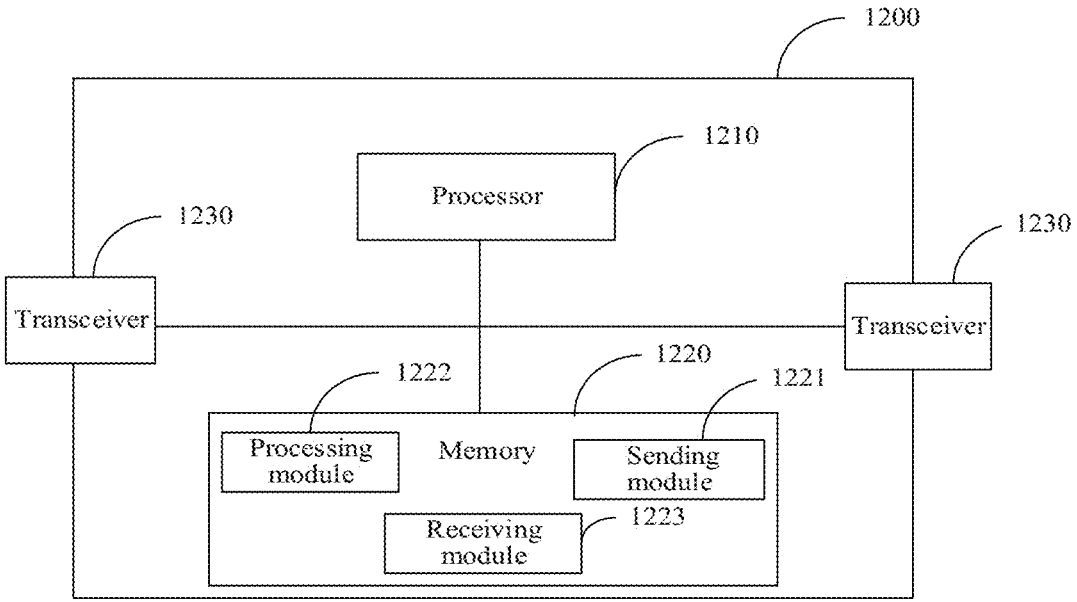
FIG. 12 is a schematic structural diagram of a network device according to an embodiment of the present disclosure.

In addition, an embodiment of the present disclosure further provides a network device 1200. FIG. 12 is a schematic structural diagram of the network device according to this embodiment of the present disclosure. As shown in FIG. 12, the network device 1200 may include a processor 1210, a memory 1220 coupled to the processor 1210, and a transceiver 1230. The transceiver 1230 may be, for example, a communication interface and an optical module. The processor 1210 may be a central processing unit (CPU), a network processor (NP), or a combination of the CPU and the NP. Alternatively, the processor may be an application-specific integrated circuit (ASIC), a programmable logic device (PLD), or a combination thereof. The PLD may be a complex programmable logic device (CPLD), a field-programmable gate array (FPGA) device, generic array logic (GAL), or any combination thereof. The processor 1210 may be one processor, or may include a plurality of processors. The memory 1220 may include a volatile memory (for example, a random-access memory (RAM). Alternatively, the memory may include a non-volatile memory (for example, a read-only memory (ROM), a flash memory, a hard disk drive (HDD), or a solid-state drive (SSD). The memory 1220 may further include a combination of the foregoing memories. The memory 1220 may be one memory, or may include a plurality of memories. In an implementation, the memory 1220 stores computer-readable instructions, and the computer-readable instructions include a plurality of software modules, for example, a sending module 1221, a processing module 1222, and a receiving module 1223. After executing each software module, the processor 1210 may perform a corresponding operation based on an indication of each software module. In this embodiment, an operation performed by one software module is actually an operation performed by the processor 1210 based on an indication of the software module. Optionally, the processor 1210 may alternatively store program code or instructions for executing the solution of the present disclosure. In this case, the processor 1201 does not need to read the program code or the instructions from the memory 1220.

The network device 1200 may be configured to perform the method 100, the method 200, the method 300, or the method 400 in the foregoing embodiments. Specifically, the network device 1200 may be used as a network device 1 to perform an operation performed by the network device 1 in the method 100 or the method 200, and the network device 1200 may be used as a network device 2 to perform an operation performed by the network device 2 in the method 100 or the method 200. The network device 1200 may be used as a first network device to perform an operation performed by the first network device in the method 300, and the network device 1200 may be used as a second network device to perform an operation performed by the second network device in the method 400. For example, when the network device 1200 is used as the network device 1 to perform the method 200, the processor 1210 is configured to execute related instructions in the memory 1220, to enable the communication apparatus 1200 to be configured to: advertise an IP Prefix route to a network device 2, where the IP Prefix route includes a GW IP address and an MPLS Label; and advertise a MAC/IP route to the network device 2, where the MAC/IP route includes an IP address of a first interface and a MAC address of the first interface.

An embodiment of the present disclosure further provides a computer-readable storage medium. The computer-readable storage medium stores instructions. When the instructions are run on a processor, the processor is enabled to perform any one or more operations in the method (for example, the method 100, the method 200, the method 300, or the method 400) in any one of the foregoing embodiments.

An embodiment of the present disclosure further provides a computer program product, including a computer program. When the computer program product runs on a processor, the processor is enabled to perform any one or more operations in the method (for example, the method 100, the method 200, the method 300, or the method 400) in any one of the foregoing embodiments.

An embodiment of the present disclosure further provides a communication system, including a first network device and a second network device. A structure of the first network device and a structure of the second network device are shown as any one of the network devices corresponding to FIG. 10 to FIG. 12. The communication system is configured to implement some or all of operations in any one of the method 100, the method 200, the method 300, and the method 400 in embodiments corresponding to FIG. 6 to FIG. 9.

An embodiment of the present disclosure further provides another communication system, including at least one memory and at least one processor. The at least one memory stores instructions, and the at least one processor executes the instructions, to enable the communication system to implement some or all of the operations in any one of the method 100, the method 200, the method 300, and the method 400 in any one of the foregoing embodiments of the present disclosure.

An embodiment of the present disclosure further provides a chip system, including a processor, where the processor is coupled to a memory. The memory is configured to store a program or instructions, and when the program or the instructions is/are executed by the processor, the chip system is enabled to implement some or all of the operations in any one of the method 100, the method 200, the method 300, and the method 400 in any one of the foregoing embodiments of the present disclosure.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in the present disclosure. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in the present disclosure.

For example, the chip system may be an FPGA, an ASIC, a system on chip (SoC), a CPU, an NP, a digital signal processing circuit (DSP), a microcontroller unit (MCU), a programmable controller (PLD), or another integrated chip.

In the specification, claims, and accompanying drawings of the present disclosure, the terms "first", "second", "third", "fourth", and so on (if existent) are intended to distinguish between similar objects but do not necessarily indicate a specific order or sequence. It should be understood that data termed in such a way are interchangeable in an appropriate circumstance, so that embodiments described herein can be implemented in another order than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

It may be clearly understood by persons skilled in the art that, for the purpose of convenient and brief description, for a detailed working process of the foregoing system, apparatus, and unit, refer to a corresponding process in the foregoing method embodiments.

In the several embodiments provided in the present disclosure, it should be understood that the disclosed system, apparatus, and method may be implemented in another manner. For example, the foregoing described apparatus embodiments are merely examples. For example, division into units is merely logical service division and there may be another division manner during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, in other words, may be located in one position, or may be distributed on a plurality of network units. Some or all of the units may be selected based on an actual requirement to achieve the objective of the solution of embodiments.

In addition, service units in embodiments of the present disclosure may be integrated into one processing unit, or each of the units may exist alone physically, or two or more units may be integrated into one unit. The integrated unit may be implemented in a form of hardware, or may be implemented in a form of a software service unit.

When the integrated unit is implemented in the form of the software service unit and sold or used as an independent product, the integrated unit may be stored in a computer-readable storage medium. Based on such an understanding, the technical solution of the present disclosure essentially, or a part contributing to a conventional technology, or all or a part of the technical solution may be implemented in a form of a software product. The computer software product is stored in a storage medium and includes several instructions for instructing one computer device (which may be a personal computer, a server, a network device, or the like) to perform all or some of the steps of the methods in embodiments of the present disclosure. The storage medium includes any medium that can store program code, such as a Universal Serial Bus (USB) flash drive, a removable hard disk, a ROM, a RAM, a magnetic disk, or an optical disc.

Persons skilled in the art should be aware that, in the foregoing one or more examples, services described in the present disclosure may be implemented by using hardware, software, firmware, or any combination thereof. When the services are implemented by using the software, the services may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible by a general-purpose or dedicated computer.

The objective, technical solution, and beneficial effects of the present disclosure have been further described in detail in the foregoing specific implementations. It should be understood that the foregoing descriptions are merely specific implementations of the present disclosure.

The foregoing embodiments are merely intended for describing the technical solution of the present disclosure instead of limiting the present disclosure. Although the present disclosure is described in detail with reference to the foregoing embodiments, persons of ordinary skill in the art should understand that they may still make modifications to the technical solution described in the foregoing embodiments or make equivalent replacements to some technical features thereof, without departing from the scope of the technical solution of embodiments of the present disclosure.

What is claimed is:

1. A first network device comprising:
   a first interface, wherein the first interface is a first supplementary broadcast domain (SBD) integrated routing and bridging (IRB) interface belonging to an SBD;

one or more processors; and
   a memory configured to store program instructions, which, when executed by the one or more processors, cause the first network device to:
   advertise an Ethernet virtual private network (EVPN) Internet Protocol (IP) prefix route to a second network device, wherein the EVPN IP prefix route comprises a gateway (GW) IP address and a Multiprotocol Label Switching (MPLS) label, wherein the GW IP address is an IP address of the first interface, and wherein the MPLS label is a label of a first IP-virtual routing and forwarding (VRF) instance of the first network device; and
   advertise an EVPN media access control (MAC)/IP route to the second network device, wherein the EVPN MAC/IP route comprises the IP address and a MAC address of the first interface, wherein the second network device comprises a second IP-VRF instance, and wherein a second interface of the second network device does not support SBD IRB.

2. The first network device of claim 1, wherein the program instructions, when executed by the one or more processors, further cause the first network device to advertise, using a route reflector, the EVPN IP prefix route and the EVPN MAC/IP route to the second network device.

3. The first network device of claim 1, wherein the first SBD IRB interface belongs to an SBD that is used to connect the first IP-VRF instance and the second IP-VRF instance of the second network device.

4. The first network device of claim 1, wherein the first network device is a network virtualization edge (NVE) device or a datacenter gateway (DGW) device.

5. The first network device of claim 1, wherein the second network device is a network virtualization edge (NVE) device or a datacenter gateway (DGW) device.

6. A second network device comprising:
   one or more processors;
   a second interface that does not support supplementary broadcast domain (SBD) integrated routing and bridging (IRB); and
   a memory configured to store program instructions, which, when executed by the one or more processors, cause the second network device to:
   receive an Ethernet virtual private network (EVPN) Internet Protocol (IP) prefix route of a first network device, wherein the EVPN IP prefix route comprises a gateway (GW) IP address and a Multiprotocol Label Switching (MPLS) label, wherein the GW IP address is an IP address of a first interface of the first network device, and wherein the MPLS label is a label of a first IP-virtual routing and forwarding (VRF) instance of the first network device;
   receive an EVPN media access control (MAC)/IP route of the first network device, wherein the EVPN MAC/IP route comprises the IP address and a MAC address of the first interface; and
   generate, based on the EVPN IP prefix route, a routing entry corresponding to a second IP-VRF instance of the second network device, wherein the routing entry comprises the MPLS label.

7. The second network device of claim 6, wherein the program instructions, when executed by the one or more processors, further cause the second network device to receive, from a route reflector, the EVPN IP prefix route and the EVPN MAC/IP route of the first network device.

8. The second network device of claim 6, wherein the program instructions, when executed by the one or more processors, further cause the second network device to:

generate, based on the EVPN IP prefix route, a routing entry corresponding to the second IP-VRF instance, wherein the routing entry comprises the GW IP address; and generate, an entry of an Address Resolution Protocol (ARP) table based on the EVPN MAC/IP route, wherein the entry comprises the IP address and the MAC address.

9. The second network device of claim 6, wherein the first network device is a network virtualization edge (NVE) device or a datacenter gateway (DGW) device.

10. The second network device of claim 6, wherein the second network device is a network virtualization edge (NVE) device or a datacenter gateway (DGW) device.

11. A computer program product comprising computer-executable instructions stored on a non-transitory computer-readable storage medium, wherein the computer-executable instructions, when executed by one or more processors of a first network device, cause the first network device to:

advertise an Ethernet virtual private network (EVPN) Internet Protocol (IP) prefix route to a second network device, wherein the EVPN IP prefix route comprises a gateway (GW) IP address and a Multiprotocol Label Switching (MPLS) label, wherein the GW IP address is an IP address of a first interface of the first network device, and wherein the MPLS label is a label of a first IP-virtual routing and forwarding (VRF) instance of the first network device; and advertise an EVPN media access control (MAC)/IP route to the second network device, wherein the EVPN MAC/IP route comprises the IP address and a MAC address of the first interface, and wherein the first interface is a first supplementary broadcast domain (SBD) integrated routing and bridging (IRB) interface belonging to an SBD, wherein the second network device comprises a second IP-VRF instance, and wherein a second interface of the second network device does not support SBD IRB.

12. The computer program product of claim 11, wherein the computer-executable instructions when executed by the one or more processors further cause the first network device to advertise, using a route reflector, the EVPN IP prefix route and the EVPN MAC/IP route to the second network device.

13. The computer program product of claim 11, wherein the first interface is used to connect the first IP-VRF instance and the second IP-VRF instance of the second network device.

14. The computer program product of claim 11, wherein the first network device is a network virtualization edge (NVE) device.

15. The computer program product of claim 11, wherein the second network device is a network virtualization edge (NVE) device.

16. The computer program product of claim 11, wherein the second network device is a datacenter gateway (DGW) device.

17. The computer program product of claim 11, wherein the first network device is a datacenter gateway (DGW) device.

\* \* \* \* \*